July 24, 1951          C. F. HILL          2,561,738

COOLING AND INSULATING ELECTRICAL APPARATUS

Filed Nov. 4, 1949          3 Sheets-Sheet 1

WITNESSES:
Robert C. Baird
Wm. L. Groome

INVENTOR
Charles F. Hill.
BY
Frederick Shapoe
ATTORNEY

Fig. 4.

Patented July 24, 1951

2,561,738

UNITED STATES PATENT OFFICE 2,561,738

COOLING AND INSULATING ELECTRICAL APPARATUS

Charles F. Hill, Pittsburgh, Pa., assignor to Westinghouse Electric Corporation, East Pittsburgh, Pa., a corporation of Pennsylvania Application November 4, 1949, Serial No. 125,459

16 Claims. (Cl. 175—356)

This invention relates to electrical apparatus, and particularly apparatus requiring a fluid dielectric atmosphere for insulation and a cooling liquid for dissipating heat developed during operation of the apparatus.

This application is a continuation-in-part of my copending applications, Serial Nos. 58,662 and 58,663, filed November 6, 1948, both now abandoned.

It is well known in the electrical industry to insulate enclosed electrical apparatus with a liquid dielectric by immersing therein the operating electrical elements for the conjoint purpose of cooling the electrical elements and electrically insulating the elements from one another and from the casing in which they are disposed. However, certain disadvantages have been found to occur in the manufacture and use of liquid dielectric insulated apparatus of this type. One disadvantage is the necessity for employing large quantities of liquid dielectric, such as oil, or chlorinated diphenyl, or the like. Thus, the average requirement is approximately five hundred gallons of liquid dielectric for a transformer unit of a thousand kva. rating. Previously used liquid dielectrics required frequent attention and periodic maintenance since they would sludge or otherwise deteriorate by reaction with any moisture and air that would enter the transformer and thereby suffered a degradation of their insulating characteristics. If an electric arc developed within a liquid dielectric-filled apparatus, it would either cause an explosion or fire when mineral oil was the liquid dielectric, or else it developed corrosive and harmful halogen fumes, if a chlorinated dielectric liquid was present, that, at the least would corrode the interior of the apparatus. Other disadvantages are known to those working in the art and need not be further set forth.

A more recent development in electrical apparatus is the so-called dry-type, air or nitrogen gas-filled, or "air-cooled" transformer, which avoids some of the shortcomings of the liquid dielectric-filled equipment. However, the gas-filled transformer has a number of its own disadvantages. One is the necessity for providing adequate means in the windings for penetration and flow of air or other gas to secure sufficient cooling of the electrical elements. Thus, solid insulating barriers between the windings and ground are not practicable because of the necessity for air ducts behind the windings, and in the absence of such solid insulating barriers, the flashover or breakdown voltage between the windings and ground limits the potentials that can be employed. The core and coil in a gas-filled transformer are bulkier for a given rating than in a liquid-cooled transformer. Gas-filled, dry-type transformer present a more difficult manufacturing problem than liquid-cooled transformers. Thus, the solid insulation on the windings must be much heavier than with liquid dielectric apparatus. A dry-type gas-filled transformer has very little overload capacity and this limits its ability to operate above its rated capacity and affects its dependability as contrasted to the liquid dielectric-filled apparatus.

An object of this invention is to provide enclosed electrical apparatus embodying fire and explosion-proof gases for electrical insulation and provided with liquid cooling to dissipate heating developed in use, the liquid required being a small fraction of that required heretofore.

A further object of this invention is to cool electrical windings by flowing over the members a thin layer or film of a liquid fluorinated organic compound which effects cooling by evaporation, the evolved vapors of the fluorinated organic compound providing insulation for the electric windings.

Another object of the invention is to provide an enclosed electrical apparatus relying on a fluorinated compound gaseous atmosphere for insulation, and the cooling of the electrical elements is secured mainly by spraying or flowing a fluorocarbon liquid over the elements to enable cooling by evaporation of the fluorocarbon.

Another object of the invention is to provide for the efficient dissipation of the heat generated by the operating electrical elements of electrical apparatus sealed in a casing, wherein a readily vaporizable liquid fluorinated organic compound is applied to the elements to cool them by evaporation by providing for the segregation of non-condensable gas in a portion of the casing remote from the operating elements during operation thereof, so that the fluorinated organic vapors may flow to the casing and condense more rapidly.

Other objects of the invention will in part be obvious, and will in part appear hereinafter.

For a better understanding of the nature and objects of the invention, reference should be had to the following detailed description and drawing, in which.

In accordance with the present invention, an enclosed electrical apparatus is produced that combines the advantages of the liquid dielectric-filled type of apparatus in many respects, and also the advantages of the gas-filled type of electrical equipment, with few or none of the disadvantages of either type of apparatus, and with several unique advantages of its own. Specifically, the operating electrical elements or windings of the apparatus are cooled by flowing, spraying, or otherwise distributing over the surfaces to be cooled thin layers, streams or films of certain liquid fluorinated organic compounds having a boiling point of between 50° C. and 225° C. at atmospheric pressure. The liquid fluorinated organic compounds comprise compounds selected from the group consisting of hydrocarbons, hydrocarbon ethers and tertiary hydrocarbon amines in which at least half the hydrogen atoms have been substituted by at least one halogen selected from the group consisting of chlorine and fluorine and of which at least half of the halogen is fluorine. The hydrocarbons and the hydrocarbon groups attached to oxygen or nitrogen atoms may be aliphatic, aromatic, cycloaliphatic and alkaryl. Liquid perfluorocarbons, perfluorocarbon ethers and perfluorocarbon tertiary amines boiling between 50° C. and 225° C. have outstanding properties for the purpose of the invention. Perhalocarbon compounds composed of only carbon and a halogen selected from at least one of the group consisting of chlorine and fluorine, of which fluorine comprises at least half the halogen atoms, have proven to be highly useful.

The fluorinated organic compound, or a mixture of two or more compounds, cools the electrical elements mainly by its evaporation. The fluorinated organic compound vapors so evolved flow to the enclosing casing in which the elements are disposed and condense on contact with the relatively cold walls of the casing, or they may be condensed in a radiator, or by other suitable means. The condensed liquid compound and any portion that did not evaporate when sprayed or flowed over the electrical windings, are collected and reflowed or resprayed. A relatively small amount of liquid fluorinated organic compound has been found to be sufficient for effective cooling of a given electrical apparatus. Thus, for a transformer of a rating of a thousand kva., approximately ten gallons of liquid fluorinated organic compound are adequate. A larger amount of the compound may be present if desired as a safety factor.

The vapors of the fluorinated organic compound as defined herein have outstanding electrical insulating properties. They are superior to practically all other gases in such electrical insulating characteristics as breakdown strength, dielectric strength, power factor and resistance to formation of corona under similar conditions of temperature and pressure. These compounds are outstanding in their stability to chemical and thermal breakdown, being surpassed only by the permanent gases. The fluorinated compounds in the liquid state exert negligible, if any, solvent or deteriorating action on ordinary insulating materials and varnishes employed in the preparation of conventional electrical elements, such as windings, cores, and coils.

Examples of suitable fluorinated organic compounds to use in practicing the invention are:

| | Boiling point, °C. |
|---|---|
| Perfluorophenanthrane | 205 |
| Perfluorodibutyl ether | 100 |
| Perfluorotriethyl amine | 71 |
| Perfluorotributyl amine | 178 |
| Perfluorodimethylcyclohexane | 101 |
| Perfluoromethylcyclohexane | 76 |
| Perfluoro-n-heptane | 82 |
| Perfluorotoluene | 102 |
| Monochlorotetrafluoro-(trifluoromethyl)-benzene | 137 |
| Dichlorotrifluoro-(trifluoromethyl) benzene | 170 |
| Trichlorodifluoro-(trifluoromethyl) benzene | 207 |
| Monochloropentadecafluoroheptane | 96 |
| 2-chloro-1,4 - bis(trifluoromethyl)benzene | 148 |
| 2-chlorotrifluoromethylbenzene | 150 |
| Perfluorodiethylcyclohexane | 148 |
| Perfluoroethylcyclohexane | 101 |
| Perfluoropropylcyclohexane | 123 |
| Chlorononafluorobis(trifluoromethyl)-cyclohexane | 129 |
| Perfluoronaphthalane | 140 |
| Perfluoro-1-methylnaphthalane | 161 |
| Perfluorodimethylnaphthalanes | 177 to 179 |
| Perfluoroindane | 116 to 117 |
| Perfluorofluorane | 190 |
| Perfluorobicyclo-(2.2.1)-heptane | 70° C. (746 mm.) |

The amines, and ethers may have dissimilar halogen substituted hydrocarbon groups present as, for example, 2,2-dichloro-1,1,1,-trifluoroethyl-perfluorobutylether and perfluorodibutylethyl-amine. The freezing points of the above listed liquid compounds are below zero degrees centigrade, many being below −50° C., so that they can be safety employed individually or in mixtures under nearly all ambient conditions to be expected in service.

While the specification hereafter will refer at times particularly to perfluoromethylcyclohexane as an example of a suitable compound, it will be understood that other fluorinated compounds as defined herein may be substituted in whole or in part therefor. The physical properties of perfluoromethylcyclohexane are as follows:

Boiling point, 76.3° C.
Heat of vaporization, 22 calories per gram at the boiling point
Specific heat, 0.2 calories per gram
Density, 1.8
Freezing point, Below −50° C.

The heat of vaporization varies with the fluorinated compound being used, and falls in the range of about 18 to 50 calories per gram.

Figure 1:
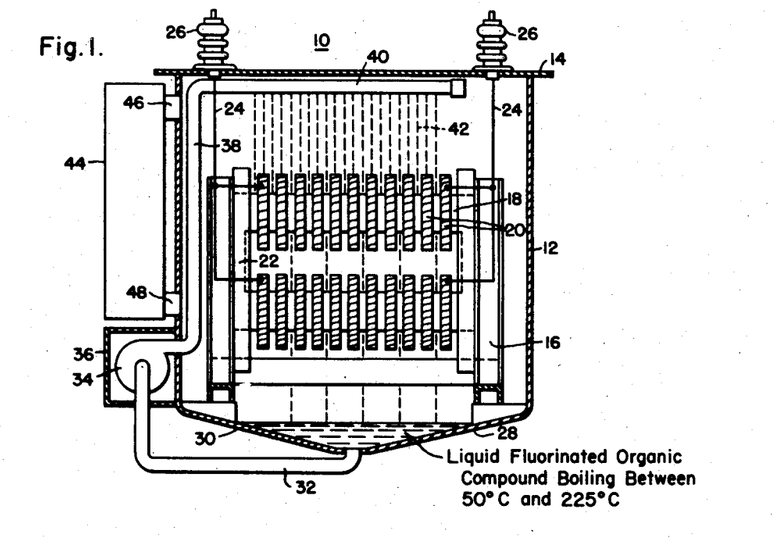
Figure 1 is a vertical cross-section through a transformer constructed in accordance with the invention.

For an illustration of a practice of the invention, reference should be had to Figure 1 of the drawing showing a transformer 10 comprising a sealed casing 12 with a cover 14. Within the casing, there is disposed a grounded supporting means 16 on which is mounted a magnetic core 18 and electrical coils or windings 20 cooperating with one another and disposed to facilitate flow of layers of liquid dielectric thereover. Solid insulating barriers 22 are interposed between the windings and the ground means 16. The windings are provided with leads 24 passing through the cover 14 by means of bushings 26. The bottom of the casing is formed to provide a sump 28 in which there is disposed a supply 30 of a fluorinated organic compound, for example, perfluoromethylcyclohexane. It will be noted that the supply of liquid fluorinated compound 30 in the sump is so small that it does not come in contact with the core 18 or windings 20. However it does no harm if a part of the elements does touch the condensed liquid, but no substantial part should be immersed in the liquid. A conduit 32 is connected to the bottom of the sump 28 for withdrawing the liquid compound therefrom upon operation of a pump 34 connected to the conduit 32. The pump 34 is disposed within a protective casing 36 so that it may be attended to or checked without opening the casing 12. The liquid compound from the pump 34 passes to a pipe 38 and thence to a spray device 40 for distributing a spray or flow 42 of the liquid fluorinated compound over the coils 20 and core 18. The liquid fluorinated compound spray 42 distributes itself as a thin film over the electrical elements and is caused to evaporate freely if the coil and core are hot, thereby absorbing heat from the core and coil proportional to the amount of the compound vaporized and its heat of vaporization. The cooling so produced has been found to be outstandingly efficient and effective in maintaining uniform temperatures. The evolved vapors of the compound flow to the walls of the casing 12 where some condensation takes place and any liquid compound flows back into the sump 28 from where it is re-used. The vapors also flow to a radiator 44 attached to the casing 12. The vapors enter the radiator 44 through inlet 46 and the condensed liquid compound runs back into the transformer through the outlet 48. In some cases, it will not be necessary to employ a radiator if the walls of the casing 12—14 are sufficient to dissipate the developed heat to the atmosphere.

The transformer shown in Figure 1 is lighter than a liquid dielectric immersed type of transformer for the same rating. The electrical elements are more compact than in an air-cooled transformer of the same size. It is fireproof and explosion-proof. The design is greatly simplified over air-cooled structures since a solid ground insulating barrier 22 is used and no excessive air ducting is required.

The insulation employed in the electrical apparatus will be selected to withstand the temperatures at which the apparatus is intended to operate. Thus, for service temperatures of up to about 110° C. the insulation may be paper, pressboard, ordinary resins, cotton, wood spacers and the like, and the fluorinated compound will be one that boils at a temperature of not over 110° C. For highest temperature service, ceramic or inorganic insulation, or silicone resins or high softening temperature fluorinated resins, such as polytetrafluoroethylene or polytrifluorochloroethylene, or a combination of any or all of these may be used, and the coolant may be a fluorinated compound boiling at temperatures as high as 225° C.

The average one thousand kva. transformer develops, at full load, heat at a rate of about 15 kw. One gallon of liquid perfluoromethylcyclohexane per minute will absorb this amount of heat by evaporation. Pump 34 accordingly should provide at least this amount of the compound to the spray device 40. Preferably the pump should be capable of pumping from two to four times this volume of liquid. The excess flow of the liquid gives the apparatus a substantial capacity to withstand overloads. A 50 kva. transformer provided with perfluoromethylcyclohexane was operated successfully for prolonged periods of time with excessive overloads developing more than 10 times the heat developed at normal load.

The vapors of the fluorinated organic compounds have outstanding electrical insulating properties and accordingly furnish an excellent insulating gas for insulating the windings 20 from one another and from the casing and other portions of the apparatus when a potential exists between the windings and the casing. Ordinarily, the casing 12 is filled with an inert, relatively permanent gas, which is relatively non-condensible under atmospheric conditions, such as nitrogen, helium or argon gas, at approximately one atmosphere, although the pressure may be considerably less, or more, for some purposes. When the apparatus 10 is not operating, the nitrogen gas comprises the greater proportion of the gas within the casing with only a small partial pressure of fluorocarbon vapor being evidenced. As the transformer is put in operation and as the temperature rises above ambient, more and more fluorocarbon vapor is generated, and the pressure within the casing 12 of the transformer will increase, though in some cases provision for venting the excess gas or accommodating it through expansion means may be present.

Figure 2:
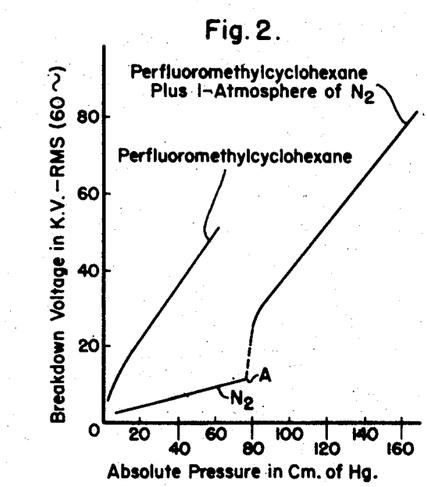
Figure 2 is a graph plotting absolute pressure against breakdown voltage for certain gases.

Referring to Figure 2 of the drawing, there is illustrated the breakdown characteristics, using for the test a gap between spheres 0.5 inch in diameter spaced 0.2 inch apart, of the gases individually and collectively present within the transformer over a wide range of pressures. When nitrogen alone is present, the breakdown voltage does not exceed approximately ten kilovolts at one atmosphere. When perfluoromethylcyclohexane is added to 76 cm. of nitrogen as shown at point A, there is a sharp increase in breakdown strength for very slight added pressure. As more perfluoromethylcyclohexane is added, the breakdown voltage rises quite rapidly so that at a total pressure of approximately eighty-five centimeters of mercury, the breakdown strength of the combined gas is approximately thirty kilovolts. At two atmospheres pressure, contributed equally by nitrogen and perfluoromethylcyclohexane vapors, the breakdown strength is approximately seventy-three kilovolts.

Figure 3:
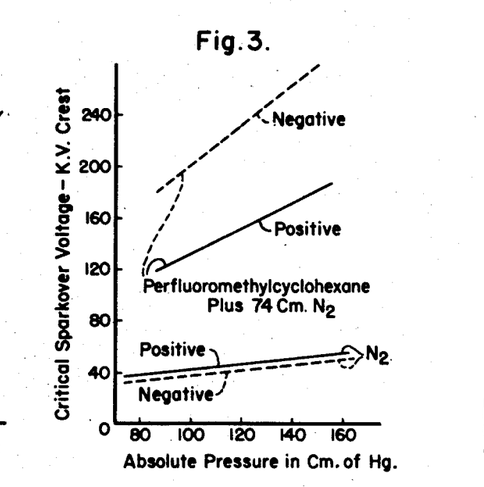
Figure 3 is a graph plotting impulse dielectric strength against gas pressures.

One of the important characteristics of a transformer is its surge impulse strength. Failure to meet high surge impulses greatly limits a transformer's field of application and renders it liable to failure when a lightning stroke or other high-voltage surge hits the transformer circuit. The fluorinated compound vapors have excellent surge impulse strength and the transformer provided therewith should withstand normally expected voltage surges as well as does chlorinated diphenyl or oil. Referring to Figure 3 of the drawing, there is illustrated the impulse dielectric strength of both nitrogen and perfluoromethylcyclohexane-nitrogen gas mixtures, tested with ½ inch square rods placed with their ends spaced two inches apart in the gas and subjected to 1½ x 40 microsecond wave. The addition of perfluoromethylcyclohexane triples, on the average, the positive impulse strength of nitrogen gas alone, while the negative impulse strength is even better.

The application of liquid fluorinated organic compounds in the form of a cooling flow or spray to electrical apparatus will increase the kva. rating possible in the manufacture of fireproof and explosion-proof apparatus. It also will enable increase in voltage rating from the present limit of about 13,000 volts for air-insulated and cooled transformers to 30,000 volts and higher.

If the casing 12 is constructed to withstand the pressures, the interior atmosphere may consist solely of the vapors of the fluorinated organic compound, such as perfluoromethylcyclohexane. Even at low ambient temperatures, the perfluoromethylcyclohexane exerts a small but substantial gas pressure. Referring to the curve in Figure 2 designated perfluoromethylcyclohexane, it will be noted that it has a very high breakdown strength even at low pressures, thus at an absolute pressure of ten centimeters of mercury, the perfluoromethylcyclohexane vapors have a breakdown strength of approximately fifteen kilovolts, which exceeds that of nitrogen at atmospheric pressures. Even at 0° C. the vapor pressure of perfluoromethylcyclohexane is approximately 4 cm. of mercury and the breakdown strength is about 10 kilovolts. The vapor pressure and the breakdown strength of perfluoromethylcyclohexane rises rapidly once the transformer is put into operation and its temperature rises so that the transformer will be adequately insulated at all times. At approximately an absolute pressure of seventy centimeters of mercury, the breakdown strength of perfluoromethylcyclohexane vapor is equal to that of transformer oil as tested on 0.5 diameter spheres separated by a 0.2 inch gap. Furthermore, mixtures of two or more compounds, at least one having a high vapor pressure at low temperatures will ensure adequate insulation resistance even at very low ambient temperatures.

Figure 4:
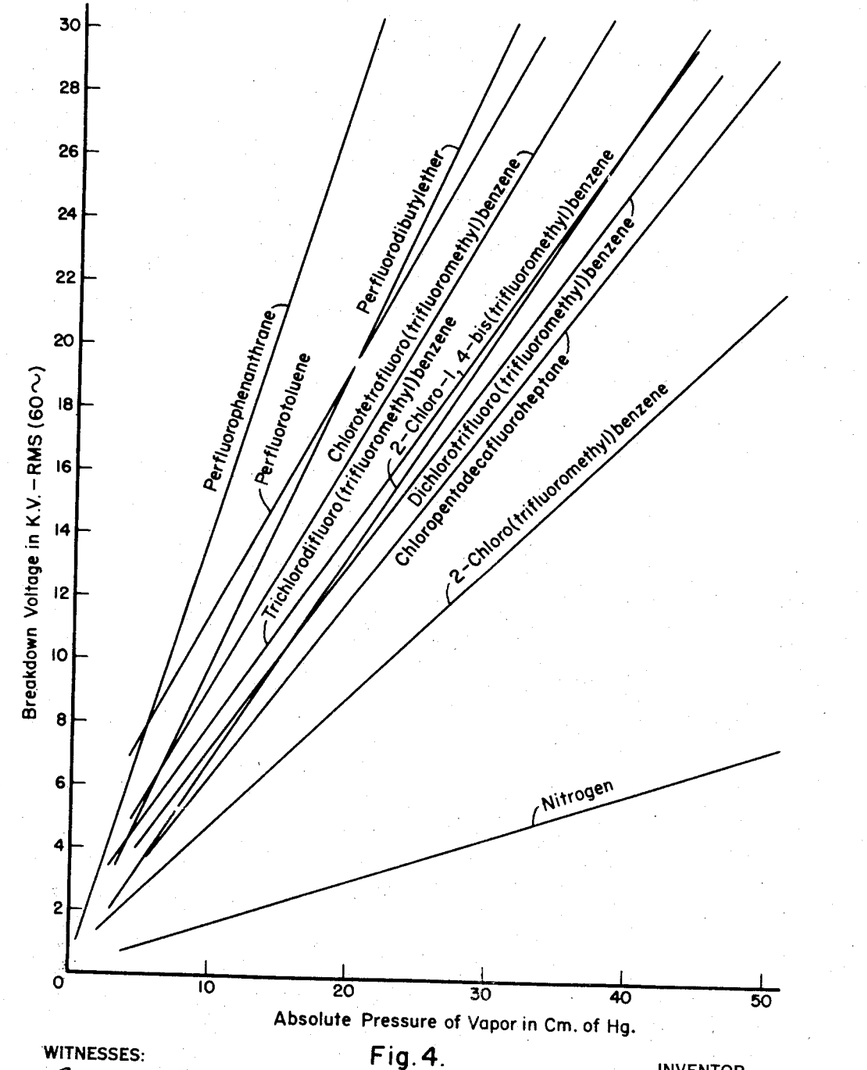
Figure 4 is a graph plotting breakdown voltage against absolute pressure of the vapors of several fluorinated compounds.

Referring to Figure 4 of the drawing, there are drawn curves of the breakdown voltage tests of nine different fluorinated compounds over a range of absolute pressures. The tests were made under the conditions described in connection with Figure 2. It will be evident that each compound exhibits an extremely high breakdown strength and at a fraction of atmospheric pressure surpasses nitrogen at atmospheric pressure.

Figure 5:
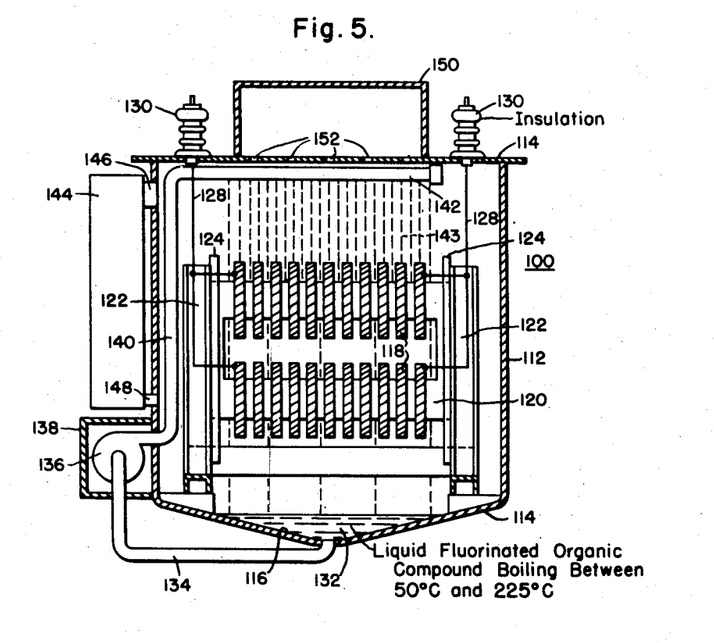
Fig. 5 is a vertical cross-section through a transformer illlustrating a modification.

Fig. 5 is directed to a modified form of enclosed apparatus constructed in accordance with this invention which embodies a gas atmosphere comprising nitrogen or other relatively inert, non-condensable gas and vapors of the fluorinated organic compound. The non-condensable gas is necessary to insure adequate initial insulation and to enable functioning with relatively moderate variation in internal gas pressure in the casing. When the apparatus is cold or inoperative, the nitrogen constitutes the preponderant volumetric proportion of the gas atmosphere, and the fluorinated organic vapors constitute the minor component. For example, in a transformer at 25° C., the partial pressure of nitrogen may be seventy centimeters of mercury and that of the vapors of perfluoromethylcyclohexane, six centimeters of mercury. A vapor of this composition may have a dielectric breakdown strength of slightly over twenty kilovolts. When the apparatus is operating, the temperature will increase directly with the applied load, and the composition of the atmosphere immediately surrounding the windings will comprise much greater proportions of fluorocarbon vapor. However, mixtures of a non-condensable gas, such as nitrogen and fluorocarbon vapors, are not efficient in conveying heat from the operating windings to the casing walls or radiator. The non-condensable nitrogen impedes the flow of the evolved fluorocarbon vapors to the radiator or casing walls and impairs its condensation. The winding must be at a higher temperature to dissipate a given quantity of heat when non-condensable nitrogen gas is present than if only fluorocarbon vapors are present.

In order to effect the most efficient dissipation of the heat generated in the operating elements of an encased apparatus, the non-condensable gas is segregated from the vapors of the fluorinated organic compound during operation so that substantially only the vapors are present in the portion of the casing adjacent the operating elements. To this end, the casing is provided with a connecting gas reservoir of sufficient volume to receive the non-condensable gas during operation which otherwise is distributed throughout the casing. Such gas reservoir is disposed at the upper part of the casing since the vapors of the fluorinated organic compound are denser than any non-condensable gas found to be practical in the apparatus, and the segregation of the gases utilizes this difference in density.

The vapors of the fluorinated organic compound are generated from the liquid compound that is sprayed, flowed, or otherwise applied to the hot windings, and when evolved continually, the vapors of the fluorinated organic compound drive the nitrogen gas rapidly into the upper portions of the apparatus because all the fluorinated organic compounds disclosed herein having a boiling point of between 50° C. and 225° C. produce vapors that are considerably more dense than nitrogen or any other practicable non-condensable gas. Accordingly, the upper portions of the apparatus comprise or include a gas reservoir portion provided for the purpose of collecting and segregating the nitrogen. This gas reservoir constitutes a space separate and distinct from the space in the casing immediate to and surrounding the energized operating elements, such as the windings. The gas reservoir may be constructed as an integral part of the casing with suitable partitions and passageways being present to separate it from the rest of the casing, or it may constitute a more or less separate tank or the like applied to the exterior of the casing and connected therewith by conduits, openings and the like as will be set forth in detail hereinafter. In any event, the gas reservoir and casing form a cooperating hermetical structure.

The sealed casing constructed in accordance with this invention is provided with an initial electrically insulating gas atmosphere comprising nitrogen gas at a selected pressure at room temperature, that is, when the windings are cold, and vapors of the fluorinated organic compound. The pressure of such gas atmosphere increases when the apparatus is put into operation, both by reason of the increase in temperature and also by evolution of additional vapors from the liquid fluorinated organic compound present. For many purposes, the casing of the electrical apparatus may be initially filled with nitrogen at a pressure substantially that of the atmosphere or in some cases slightly above or somewhat below atmospheric pressure, at 25° C. In use, the pressure within the casing will increase to as much as two atmospheres or more, depending upon the temperatures which may be permitted in the windings and the type and amount of liquid fluorinated organic compound employed for cooling the windings.

Referring to Fig. 5 of the drawing, there is illustrated a transformer 100 constructed in accordance with the present invention. The transformer 100 comprises a casing 112 which includes a cover 114 and a sloping bottom portion which forms a sump 116. Disposed within the casing are electrical windings 118 associated with a magnetic core 120 and supported by beams 122 which are at ground potential. To insulate the windings from the beams 122, there are provided solid barriers 124 which may be composed of pressboard, impregnated phenolic laminates, ceramic plates, or similar insulation, having a high resistance of dielectric breakdown. The solid insulation 124 is extended sufficiently so that the gas path between the supports 122 and the windings 118 is long enough to reduce the possibility of flashover. It will be appreciated that in the usual gas-filled transformer, solid barriers of this type cannot be employed because of the necessity of providing air ducts from the interior of the coils past the barrier insulation. Leads 128 to the windings are connected to the bushings 130 passing through the cover 114.

Disposed within the sump portion 116 of the casing is a supply of liquid fluorinated organic compound 132 in such a small amount that the core and windings are not immersed therein. Connected to the lowest portion of the sump 116 is a conduit 134 for conveying the liquid compound 132 to a pump 136 disposed in a casing 138 attached to the side of the casing 12, whereby the pump 136 may be inspected and maintained without opening the main transformer casing 112. The output of liquid fluorinated organic compound from the pump 136 passes to a pipe 140 leading to a spray head 142 within the casing 112, for distributing the liquid compound as a spray 143 over the electrical elements. By this means a film or layer of liquid fluorinated organic compound is applied over the windings 118 and the core 120 so that the heat within the windings and core causes evaporation of at least a part of the sprayed compound, and thereby cooling is effected. In actual practice, there will be supplied more liquid compound that is required to dissipate the heat of the windings by evaporation. Consequently, a portion of the liquid compound will drain off the windings and core and flow back into the sump 116 from where it is recirculated. The vapors of the fluorinated organic compound that are evolved will flow by natural convection to the walls of the casing 112 where they are condensed and the liquid condensate flows down the walls of the casing into the sump, and the heat of condensation is dissipated to the ambient atmosphere by the walls of the casing 112. If required, there may be provided a radiator 144 fixed to the casing 112 into which the vapors pass by an opening 146 and liquid fluorinated organic compound condensed in the radiator flows back into the casing through a pipe 148.

The transformer casing 112 is initially charged with nitrogen or other relatively inert gas non-condensable under ordinary atmospheric temperatures and moderate pressures in the transformer, for example helium, argon, neon, carbon dioxide, sulfur hexafluoride, or the like, or mixtures thereof, which gases are suitable for functioning as a moderately good insulating gas at atmospheric pressure and have the requisite electrical characteristics for such service. These gases should have a density less than the fluorocarbon gases. The pressure of the nitrogen in the casing, for instance, may be substantially atmospheric, that is, seventy-six centimeters of mercury or less, if the casing 112 will withstand a partial vacuum or at times somewhat greater than atmospheric pressure. A charge of a suitable liquid fluorinated organic compound, for instance perfluoromethylcyclohexane, is then introduced into the casing, and it exerts a partial pressure of a few centimeters of mercury even at zero degree centigrade. When the transformer 100 is put into operation by applying a potential to the coils 118, the temperature of the coil and core increases with the applied load. The increase in temperature of the coil and core alone will cause the pressure of the enclosed gas atmosphere to increase. Further, due to the liquid compound evaporating, the partial pressure of the vapors of the fluorinated organic compound increases considerably with small changes in temperature. Since the vapors of the fluorinated organic compound are considerably more dense than nitrogen, and inasmuch as the vapors are evolved continually at the surface of the coil and core during operation, the nitrogen gas is driven upwardly within the casing. The nitrogen is segregated and concentrated in such upper portions of the casing in proportion to the temperature of the windings and the gas pressure.

In order to enable efficient separation of the non-condensable gas, such as nitrogen, from the vapors of the fluorinated compound so that the vapors can flow unimpeded to the walls 112 and radiator 144 and most effectively dissipate the heat generated in the core and coils, there is provided sufficient space or a suitable gas reservoir at the upper portion of the casing for the introgen to be localized. At the lower portion of the casing, that is, around the core and coils, there is thereby present only vapors of the fluorinated organic compound substantially free from non-condensable nitrogen. In some cases, the casing 112 need only be made sufficiently tall so that there is adequate free space for nitrogen to segregate. A perforated baffle or partition may be placed a few inches above the spray pipe 142 to define the volumes occupied below by the vapors of the fluorinated organic compound and above by non-condensable gas. The partition or baffle serves to prevent entrainment of the non-condensable gas by the vapors.

Fig. 5 illustrates one form of a gas segregating device. In this modification there is provided at the upper portion of the casing, either as an integral part thereof or attached to the exterior thereof, a gas reservoir 150 communicating to the interior of the casing 112 through restricted passageways 152. The volumetric capacity of the gas reservoir 150 is preferably at least half that of the gas space of the remainder of the casing, while for some purposes it may be equal and in other cases it may be of greater capacity. In operation of the transformer, nitrogen from the casing 112 is driven through the passageways 152 into the reservoir 150 both by the increase in total gas pressure due to temperature increase and by the continual evaporation of the fluorinated organic compound producing vapors of considerably greater density than the nitrogen gas. The gas within the gas reservoir 150 contains a much smaller amount of vapors of the compound than the gas atmosphere within the main part of the casing 112 because of the continual enrichment of the gas in the lower part of the casing due to continual evolution of the vapors. Ordinarily, the gas reservoir 150 will be cooler than the remainder of the transformer, and any vapors of the fluorinated compound therein in excess of the partial pressure of the fluorinated compound at that temperature will tend to condense therein and trickle back into the sump 116. Accordingly, the partial pressure of the vapor of the fluorinated compound in the gas reservoir 150 will be different than that within the casing 112 because of the difference in dynamic conditions between the two spaces defined by the gas reservoir 150 and the casing 112, respectively.

It is highly desirable that such segregation of non-condensable gas from the atmosphere in the casing 112 take place when the electrical windings and core are energized and developing heat, as compared to the mixed gas atmosphere ordinarily present in the casing at the time the apparatus is cold and non-operative. Besides providing better heat transfer when the gases segregate, the atmosphere within the casing 112 becomes progressively richer in the vapors of the fluorinated organic compound which have superior dielectric properties to nitrogen.

While the drawing is specific to a transformer, it will be understood that the invention may be applied to other types of electrical apparatus, such, for example, as switchgear, capacitors, generators, cables, reactors, and the like. Furthermore, various means for spraying or flowing the liquid fluorinated compounds may be applied to the electrical windings in a variety of ways. Thus, the liquid compounds may be introduced within the windings in various ways and permitted to stream or flow out through them. The use of spraying has been found to be most convenient in the practice of the invention, but any other means capable of applying a thin film or layer of the liquid is suitable.

Since certain changes in carrying out the process embodied in the invention described herein may be made without departing from its scope, it is intended that all matter contained in the above description shall be interpreted as illustrative and not in a limiting sense.

I claim as my invention:

1. In an electrical apparatus, a sealed casing, an electrical conductor disposed in the casing, a potential being present between the conductor and casing during use of the apparatus and heat being developed in the conductor during such use, and means for cooling the conductor comprising a fluorocarbon liquid boiling at a temperature between 50° C. and 225° C. at atmospheric pressure, and means for distributing a thin layer of the liquid fluorocarbon over the electrical conductor whereby cooling of the conductor is effected mainly by the evaporation of the applied fluorocarbon, the vapors of the fluorocarbon providing for electrically insulating the conductor and the casing.

2. In an electrical apparatus, a sealed casing, an electrical conductor disposed in the casing, a potential being present between the conductor and casing during use of the apparatus and heat being developed in the conductor during such use, and means for cooling the conductor comprising a fluorocarbon liquid boiling at a temperature between 50° C. and 225° C. at atmospheric pressure, and means for distributing a thin layer of the liquid fluorocarbon over the electrical conductor whereby cooling of the conductor is effected mainly by the evaporation of the applied fluorocarbon, the means for distributing including a sump in the lower portion of the casing, a spray device, and a pump for withdrawing fluorocarbon liquid from the sump and supplying the fluorocarbon to the spray device, the vapors of the fluorocarbon providing for electrically insulating the conductor and the casing.

3. In a transformer, a sealed casing, a magnetic core and an electrical winding disposed in the casing, a supply of liquid fluorocarbon boiling at a temperature between 50° C. and 225° C. at atmospheric pressure disposed in the casing, a spray device disposed in the casing to spray the liquid fluorocarbon over the core and electrical winding, a sump to hold the liquid fluorocarbon so that when the entire supply of fluorocarbon is in the sump the core and winding are not immersed in the liquid fluorocarbon, and pump means to withdraw the fluorocarbon from the sump and to deliver it to the spray device, the sprayed fluorocarbon serving to cool the winding and core mainly by evaporation and the evolved vapors providing an insulating gas within the casing.

4. The method of insulating and cooling an electrical conductor disposed in a casing, comprising flowing a thin layer of a liquid fluorocarbon over the electrical conductor, the liquid fluorocarbon composed of at least one fluorocarbon compound boiling at a temperature of between 50° C. and 225° C. at atmospheric pressure, whereby evaporation of the fluorocarbon cools the conductor and the evolved vapors provide an insulating gas atmosphere.

5. The method of insulating and cooling an electrical conductor disposed in a sealed casing, the casing having an atmosphere composed of nitrogen and fluorocarbon, comprising flowing a thin layer of a liquid fluorocarbon over the electrical conductor, the liquid fluorocarbon composed of at least one fluorocarbon compound boiling at a temperature between 50° C. and 225° C. at atmospheric pressure, whereby cooling of the conductor is effected mainly by evaporation of the liquid fluorocarbon and the evolved fluorocarbon vapors in combination with nitrogen provide an insulating gas for the conductor.

6. In an electrical apparatus, a sealed casing, an electrical conductor disposed in the casing, a potential being present between the conductor and casing during use of the apparatus and heat being developed in the conductor during such use, and means for cooling the conductor comprising at least one liquid fluorinated organic compound selected from the group consisting of hydrocarbons, hydrocarbon ethers and tertiary hydrocarbon amines in which at least half the hydrogen atoms have been substituted by at least one halogen selected from the group consisting of fluorine and chlorine, and at least half the halogen is fluorine, the compound having a boiling point of from 50° C. to 225° C. at atmospheric pressure, the quantity of the liquid fluorinated organic compound associated with the apparatus being insufficient to immerse any substantial portion of the electrical conductor to be cooled, and means for applying to the surface of the electrical conductor the liquid fluorinated organic compound at a rate sufficient to dissipate mainly by evaporation heat developed by the electrical conductor during use, whereby cooling of the conductor is effected mainly by the evaporation of the applied fluorinated organic compound, the vapors of the fluorinated organic compound providing for electrically insulating the conductor and the casing.

7. In a transformer, a sealed casing, a magnetic core and an electrical winding disposed in the casing, a supply of at least one fluorinated organic compound selected from the group consisting of hydrocarbons, hydrocarbon ethers and tertiary hydrocarbon amines in which at least half the hydrogen atoms have been substituted by at least one halogen selected from the group consisting of fluorine and chlorine, and at least half the halogen is fluorine, the fluorinated organic compound boiling at a temperature of between 50° C. and 225° C. at atmospheric pressure, the compound disposed in the casing, a spray device disposed in the casing to spray the liquid fluorinated compound over the core and electrical winding, a sump to hold the liquid fluorinated compound so that when the entire supply of fluorinated compound is in the sump the core and winding are not immersed in the liquid fluorinated compound, and pump means to withdraw the fluorinated compound from the sump and to deliver it to the spray device, the sprayed fluorinated compound serving to cool the w'nding and core mainly by evaporation and the evolved vapors providing an insulating gas within the casing.

8. In an electrical apparatus, a sealed casing, an electrical conductor disposed in the casing, a potential being present between the conductor and casing during use of the apparatus and heat being developed in the conductor during such use, and means for cooling and insulating the conductor comprising a liquid perhalocarbon compound in which the only atoms are carbon and at least one halogen selected from the group consisting of chlorine and fluorine, at least half of the halogen atoms being fluorine, the liquid boiling at a temperature between 50° C. and 225° C. at atmospheric pressure, the quantity of the liquid perhalocarbon compound associated with the apparatus being insufficient to immerse any substantial portion of the electrical conductor to be cooled, and means for applying to the surface of the electrical conductor the liquid fluorinated organic compound at a rate sufficient to dissipate mainly by evaporation heat developed by the electrical conductor during use, whereby cooling of the conductor is effected mainly by the evaporation of the applied compound, the vapors of the compound providing for electrically insulating the conductor and the casing.

9. The method of insulating and cooling an electrical conductor disposed in a sealed casing comprising flowing a thin layer of a dielectric liquid comprising a perhalocarbon compound in which the halogen is selected from the group consisting of fluorine and chlorine and at least half of the halogen atoms being fluorine, the substituted compound boiling at a temperature of between 50° C. and 225° C. at atmospheric pressure, whereby evaporation of the compound cools the conductor and the evolved vapors provide an insulating atmosphere.

10. The method of insulating and cooling an electrical conductor disposed in a sealed casing comprising flowing a thin layer of a dielectric liquid perhalocarbon compound in which the only atoms are carbon and at least one halogen selected from the group consisting of chlorine and fluorine at least half of the halogen atoms being fluorine, the compound boiling at a temperature of between 50° C. and 225° C. at atmospheric pressure, whereby evaporation of the compound cools the conductor and the evolved vapors provide an insulating atmosphere.

11. In a sealed electrical apparatus, in combination, a sealed casing having a main portion, an electrical winding disposed in the main portion of the sealed casing, the electrical winding being subject to the flow of electrical current in operation whereby heat is developed in the winding, means for dissipating the heat from the winding comprising a supply of at least one liquid fluorinated organic compound selected from the group consisting of hydrocarbons, hydrocarbon ethers and tertiary hydrocarbon amines, in which compound at least half the hydrogen atoms have been substituted by at least one halogen selected from the group consisting of fluorine and chlorine, and at least half the halogen atoms are fluorine, the compound having a boiling point of from 50° C. to 225° C. at atmospheric pressure, means for applying thin layers of the fluorinated organic compound to the winding to cool it by evaporation of the fluorinated organic compound, an inert electrically insulating gas disposed in the casing comprising a mixture of a gas noncondensable under ordinary atmospheric temperatures and moderate pressures and the vapors of the fluorinated organic compound, the noncondensable gas being volumetrically preponderant when the apparatus is cold, the vapors of the fluorinated organic compound being denser than the non-condensable gas, the pressure of the insulating gas in the casing increasing as the temperature increases, and a gas reservoir portion of a volume of at least one-half of the gas space in the man portion of the casing, the gas reservoir being disposed above the main portion of the casing, whereby when the temperature of the winding rises the liquid fluorinated organic compound applied to the winding evolves more vapors thereby increasing the proportion thereof in the insulating gas and more of the relatively less dense noncondensable gas is segregated in the gas reservoir, so that the vapors of the fluorinated organic compound are able to dissipate more effectively the heat of the winding.

12. The apparatus of claim 11, wherein the non-condensable gas is nitrogen.

13. In a sealed transformer, a hermetical casing, a coil and core in the casing, the coil being subjected to an electrical current when in service whereby heat develops in the coil and core, means for dissipating the heat from the coil and the core comprising a supply of liquid fluorinated organic compound selected from the group consisting of hydrocarbons, hydrocarbon ethers and tertiary hydrocarbon amines, in which compound at least half the hydrogen atoms have been substituted by at least one halogen selected from the group consisting of fluorine and chlorine, and at least half the halogen atoms are fluorine, the compound boiling at a temperature between 50° C. and 225° C. at atmospheric pressure, and means for spraying the liquid fluorinated organic compound over the coil and core to cool them by evaporation of the fluorinated organic compound, an insulating gas in the casing comprising a mixture of nitrogen and vapors of the fluorinated organic compound, the fluorinated organic compound vapors being denser than nitrogen, the insulating gas composed of a preponderant volume of nitrogen when the apparatus is cold, the proportion of the fluorinated organic compound vapors in the insulating gas increasing as the temperature of the coil and core increases, a gas reservoir separated from the portion of the casing adjacent the coil and core with a gas passageway between the reservoir and said portion of the casing, the gas reservoir having at least half the volume of the gas space in said portion of the casing, the gas reservoir being disposed at the upper part of the casing, whereby when the temperature of the coil and core increases liquid fluorinated organic compound sprayed thereon evolves fluorinated organic compound vapors thereby increasing the insulating gas pressure and the relatively less dense nitrogen gas is driven into the gas reservoir, and the fluorinated organic compound vapors flowing to walls of the casing are partially condensed into liquid and are resprayed.

14. In a sealed electrical apparatus, in combination, a sealed casing having a main portion, an electrical winding disposed in the main portion of the casing, the electrical winding being subjected to flow of electrical current which develops heat therein, means for dissipating the heat from the winding comprising a supply of liquid perfluorocarbon boiling at a temperature between 50° C. and 225° C. at atmospheric pressure and means for applying thin layers of the liquid fluorocarbon over the winding to cool it by evaporation, an inert insulating gas disposed in the casing comprising a mixture of a gas non-condensable at ordinary atmospheric temperatures and moderate pressures, and perfluorocarbon vapors with the non-condensable gas being volumetrically preponderant when the apparatus is cold, the perfluorocarbon vapors being denser than the non-condensable gas, the pressure of the insulating gas in the casing increasing as the temperature increases, and a gas reservoir of a volume of at least one-half of the gas space in the main portion of the casing, the gas reservoir being disposed above the main portion of the casing, whereby when the temperature of the winding increases the liquid perfluorocarbon applied to the winding evolves vapors thereby increasing the insulating gas pressure in the casing and the relatively less dense non-condensable gas is segregated in the gas reservoir, and the perfluorocarbon vapors are enabled to more effectively dissipate the heat of the electrical winding.

15. In a sealed electrical apparatus, in combination, a sealed casing, an electrical winding disposed in the casing, the electrical winding being subjected to flow of electrical current which develops heat therein, means for dissipating the heat from the winding comprising a supply of liquid perfluorocarbon boiling at a temperature between 50° C. and 225° C. at atmospheric pressure and means for applying thin layers of the liquid perfluorocarbon over the winding to cool it by evaporation, an insulating gas disposed in the casing comprising a mixture of nitrogen and perfluorocarbon vapors with nitrogen being volumetrically preponderant when the apparatus is cold, the perfluorocarbon vapors being denser than nitrogen, and with the proportion of perfluorocarbon in the gas increasing as the temperature of the winding increases, the pressure of the insulating gas in the casing also increasing as the temperature increases, and a gas reservoir of at least half the volume of the gas space in the casing disposed at the upper portion of the casing and having means for flow of gas therebetween, whereby when the temperature of the winding increases the liquid perfluorocarbon applied to the winding evolves vapors thereby increasing the insulating gas pressure in the casing and the relatively less dense nitrogen gas is concentrated in the gas reservoir, and enabling the perfluorocarbon vapors to dissipate heat generated in the electrical winding more effectively.

16. In a sealed transformer, a hermetical casing, a coil and core in the casing, the coil being subjected to flow of electrical current when in service whereby heat develops in the coil and core, means for dissipating the heat from the coil and the core comprising a supply of liquid perfluorocarbon boiling at a temperature between 50° C. and 225° C. at atmospheric pressure, and means for spraying the liquid perfluorocarbon over the coil and core to cool them by evaporation of the perfluorocarbon, an insulating gas in the casing comprising a mixture of nitrogen and vapors of the perfluorocarbon, the perfluorocarbon vapors being denser than nitrogen, the insulating gas composed of a preponderant volume of nitrogen when the apparatus is cold, the proportion of the perfluorocarbon vapors in the insulating gas increasing as the temperature of the coil and core increases, a gas reservoir separated from the portion of the casing adjacent the coil and core with a gas passageway between the reservoir and said portion of the casing, the gas reservoir being disposed at the upper part of the casing and equaling in volume at least half of the gas space of said portion of the casing, whereby when the temperature of the coil and core increases liquid perfluorocarbon sprayed thereon evolves perfluorocarbon vapors thereby increasing the insulating gas pressure and the relatively less dense nitrogen gas is driven into the gas reservoir, and the perfluorocarbon vapors flow to walls of the casing and condense into liquid and are resprayed.

CHARLES F. HILL.

No references cited.